Figure 1:
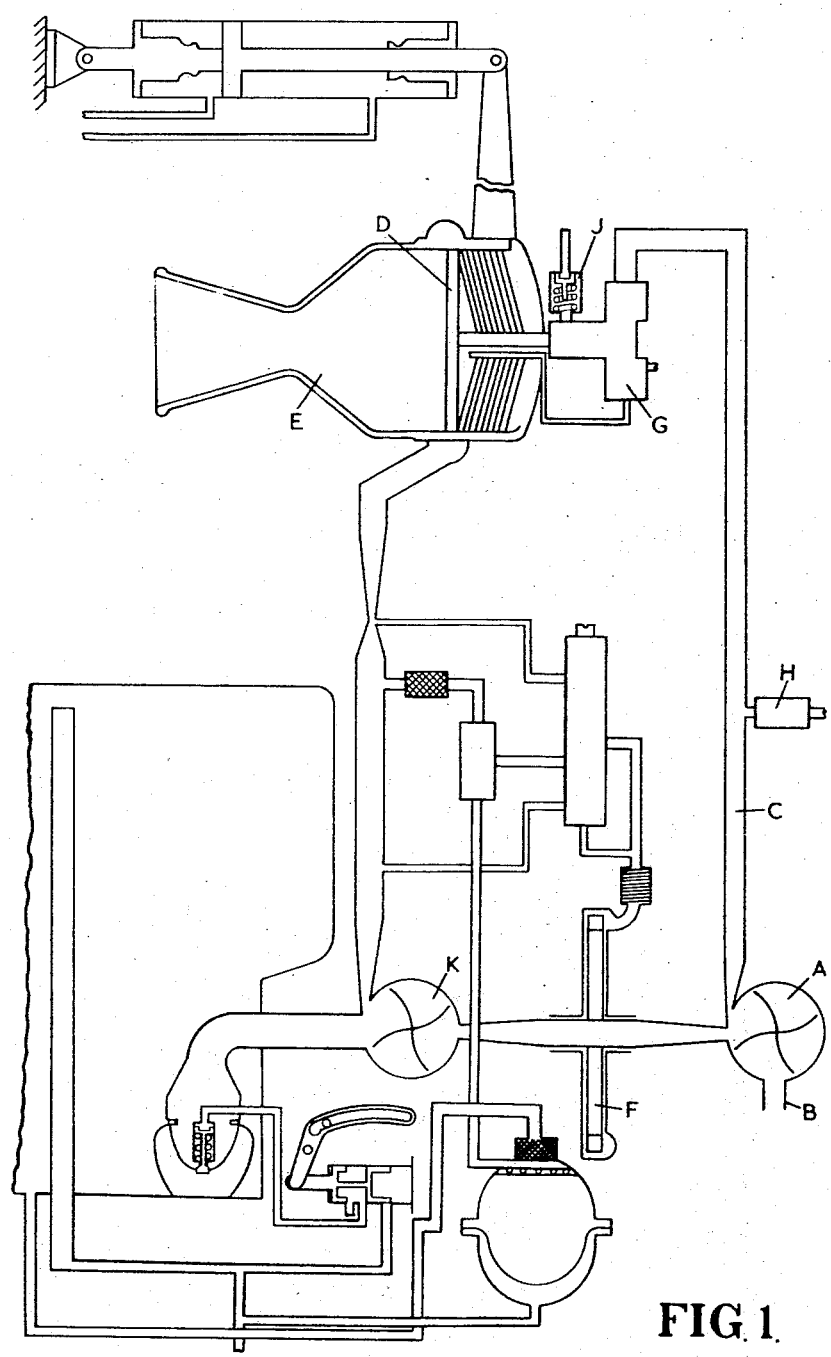

Dec. 19, 1967   M. S. HUNT   3,358,455
PROPELLENT SHUT-OFF VALVE FOR A ROCKET ENGINE
Filed Aug. 14, 1964   2 Sheets-Sheet 1

Dec. 19, 1967   M. S. HUNT   3,358,455
PROPELLENT SHUT-OFF VALVE FOR A ROCKET ENGINE
Filed Aug. 14, 1964   2 Sheets-Sheet 2
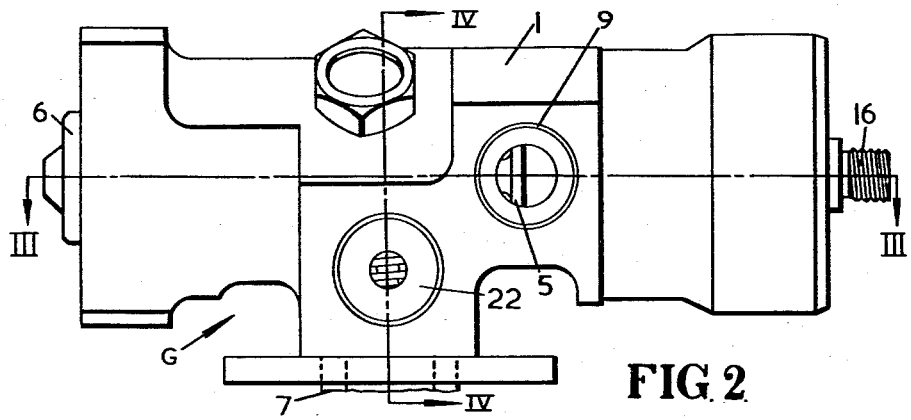

United States Patent Office 3,358,455
Patented Dec. 19, 1967

3,358,455
PROPELLENT SHUT-OFF VALVE FOR A
ROCKET ENGINE
Michael S. Hunt, Coventry, England, assignor to Bristol Siddeley Engines Limited, Bristol, England
Filed Aug. 14, 1964, Ser. No. 389,693
Claims priority, application Great Britain, Aug. 16, 1963, 32,479/63
3 Claims. (Cl. 60—243)

The invention relates to a shut-off valve to be located in a supply line for a propellent (i.e. fuel or oxidant) to be supplied to the burner assembly of a rocket engine.

It is most important that, to avoid the risk of an explosion, the propellant shut-off valve must not allow any propellent to pass into the combustion chamber before it is required. To achieve this the propellent supply line between the shut-off valve and the burner assembly should be kept drained of propellent when the valve is closed. It is also desirable that the burner assembly should be purged of propellent, after operation of the engine has finished, by passing nitrogen through the line between the valve and the burner assembly and therethrough into the combustion chamber. An object of the invention is to provide a propellent shut-off valve by which these precautions can be performed.

According to the invention, the propellent shut-off valve, to be located between a propellent pump and a burner assembly in a rocket engine, comprises a housing, having therein a pair of spaced valve seats; a pair of co-axial valve members, each co-operable with a respective seat, one of the valve members being operable to control the flow of propellent from the propellent pump, through the housing, to the burner assembly and the other valve member being operable to control a vent communicating with the space in the housing between the two seats, whereby any propellent in the space when the propellent-controlling valve member is closed will be drained from the housing, spring means arranged to bias the valve members to positions in which the propellent-controlling valve members is closed and the vent-controlling valve member is open and a piston responsive to a pressure produced during the operation of the engine and movable thereby against the bias of the spring means into the position in which the propellent-controlling valve member is open and the vent-controlling valve member is closed.

The housing may also include an inlet arranged to be connected via a non-return valve to a source of nitrogen, to purge the burner assembly, when the propellent-controlling valve member is in the closed position, and a non-return valve member, positioned downstream of the propellent-controlling valve member and arranged to isolate the space between the seats from the burner assembly and to be opened against the bias of a return spring by the flow of propellent through the propellent-controlling valve member.

The invention also relates to a rocket engine propellent control system including a propellent shut-off valve, as set out in the two immediately preceding paragraphs, and a propeller pump. The control system may include a bleed valve positioned upstream of the shut-off valve, the bleed valve having an outlet, through which propellent can be drained from the system upstream of the shut-off valve, or through which air can be bled from the system during starting of the engine, and a valve member which is held open to the outlet by spring means, except during operation of the pump when the delivery pressure of the latter will oppose the spring means and thereby close the outlet.

By way of example of the invention, a fuel control system for a rocket engine and a fuel shut-off valve therefor will now be described, with reference to the accompanying drawings, in which:

FIGURE 1 is a diagram showing a combined fuel and oxidant control system for the rocket engine;
FIGURE 2 is a side elevation of the fuel shut-off valve, which is also shown in FIGURE 1;
FIGURE 3 is a longitudinal section through the valve on the line III—III in FIGURE 2;
FIGURE 4 is a transverse section through the valve on the line IV—IV in FIGURE 2, and
FIGURE 5 is an axial section through a bleed valve associated with the shut-off valve also shown in FIGURE 1.

Referring to FIGURE 1, the fuel control system comprises a fuel pump A supplied with fuel from a fuel tank (not shown) through an inlet pipe B and delivering fuel through a pipe C to the burner assembly D of a combustion chamber E. The pump A is driven by a steam turbine F, which also drives an oxidant pump K, supplying hydrogen peroxide to the combustion chamber. The control system for the oxidant pump and the turbine is described in copending application No. 389,744 filed Aug. 14, 1964, and Patent No. 3,306,038, and is not described in this specification. Fuel is admitted from the pipe C to the burner assembly D through a shut-off valve G, described in detail hereinafter with reference to FIGURES 2 to 4. The pipe C contains a bleed-valve H also described in detail hereinafter with reference to FIGURE 5.

Referring to FIGURES 2 to 4, the shut-off valve comprises a housing 1 containing two co-axial valve seats 2 and 3 spaced apart from each other and a pair of co-axial valve members 4 and 5, co-operable with the seats 2 and 3 respectively. The valve members are slidable within the housing between positions in which one valve member is open and the other valve member is closed and vice versa. The valve member 4 controls the flow of fuel through the housing between an inlet 6 and an outlet 7, communicating with the chamber 8 between the seats 2 and 3. The inlet 6 is connected to the delivery pipe C from the fuel pump A and the outlet 7 is connected to the burner assembly D. The valve member 5 controls the flow of fuel from the chamber 8 between the seats to a vent 9 leading from the housing. The valve members 4 and 5 are biased by springs 10 and 11 respectively into positions in which the fuel-controlling valve member 4 is closed and the vent-controlling valve member 5 is open. The valve member 5 has, at the end thereof remote from the seat 3, an integral piston 12 slidable in a chamber 14 provided in the housing and has an axial extension 15 at the opposite end engageable, when the valve member 5 is in the closed position, with the fuel-controlling valve member 4, thereby to hold the latter open against the bias of its spring 10. The chamber 14 has an inlet connection 16 through which steam pressure is applied to move the piston 12, and hence both valve members, against the respective springs 10 and 11 into the position in which the fuel-controlling valve member 4 is open and the vent-controlling valve member 5 is closed. Ports 17 are provided in the wall of the chamber 14 adjacent the end thereof remote from the steam inlet connection 16 to permit the piston 12 to slide freely in the chamber 14 and to remove steam that may have leaked past annular seals 18 provided around the piston. The steam inlet connection 16 leads to the combustion chamber E, where steam is produced by decomposition of hydrogen peroxide, when the latter is introduced to a catalyst in the combustion chamber and during combustion. When the supply of hydrogen peroxide ceases, the steam pressure will fall and the springs 10 and 11 will move the valves 4 and 5 to their other positions in which the fuel-controlling valve member 4 is closed and the vent-controlling valve member 5 is open. This allows any fuel remaining in the chamber 8, or reaching said chamber due to leakage past the closed fuel-controlling valve 4, to drain away through the vent 9.

A non-return valve member 20, operable independently of the valve members 4 and 5, is positioned in the housing downstream of the fuel-controlling valve 4 between the fuel outlet 7 and the chamber 8. The non-return valve member 20 is biased by a spring 21 towards the closed position and is opened by the pressure of fuel in the chamber 8. Thus when fuel is not flowing between the inlet 6 and the outlet 7, the non-return valve member 20 is closed, thereby isolating the chamber 8 from the burner assembly D. An inlet connection 22 is provided in the housing 1 to a chamber 23, between the non-return valve member 20 and the fuel outlet 7, for the introduction into the combustion chamber, via a further non-return valve J (not shown in FIGURE 4 but indicated in FIGURE 1), of nitrogen under pressure, when the non-return valve member 20 has closed, thereby to purge the burner assembly D of fuel, the non-return valve member 20 being closed preventing the loss of nitrogen through the chamber 8 to the vent 9.

The provision of the vent 9 and the introduction of nitrogen together ensure that any fuel remaining in the fuel system downstream of the fuel-controlling valve member 4 after combustion or entering this part of the system due to leakage past the latter valve member when it is closed will quickly be removed.

As a further precaution, the bleed valve H is provided in the fuel pipe C upstream of the shut-off valve G. Referring to FIGURE 5, the bleed valve comprises a housing 26 containing a valve member 25 engageable with a seat formed by an internal shoulder 27 and communicating with a drain outlet 28. The valve member 25 is mounted on spindles 29 and 30 and is held open in the position illustrated by a light spring 31. The bleed valve is used to vent air from the fuel line C during starting through an inlet port 32, the seat 27 and the outlet 28. The valve member 25 is only closed during operation of the fuel pump and as soon as the fuel pump stops, the valve member 25 will be opened by the spring 31, thereby allowing any fuel remaining in the fuel system upstream of the shut-off valve G to drain away.

Although in the foregoing description the shut-off valve G is for controlling the flow of fuel to the burner assembly D, a similar valve may be used instead or additionally in the oxidant supply line leading to the combustion chamber.

What I claim as my invention and desire to secure by Letters Patent of the United States is:

1. A shut-off valve, for location between a propellent pump and a burner assembly in a rocket engine, said shut-off valve comprising a housing, having therein a pair of spaced valve seats; a pair of co-axial valve members, each co-operable with a respective seat, one of the valve members being operable to control the flow of propellent from the propellent pump, through the housing to the burner assembly and the other valve member being operable to control a vent communicating with the space in the housing between the two seats, whereby any propellent in the space when the propellent-controlling valve member is closed will be drained from the housing, spring means arranged to bias the valve members to positions in which the propellent-controlling valve member is closed and the vent-controlling valve member is open, a piston responsive to a pressure produced during the operation of the engine and movable thereby against the bias of the spring means into the position in which the propellent-controlling valve member is open and the vent-controlling valve member is closed, an inlet in said housing to be connected to a source of nitrogen to purge the burner assembly, when the propellent-controlling valve member is in the closed position, and a non-return valve member, positioned downstream of the propellent-controlling valve member and arranged to isolate the space between said seats from the burner assembly and to be opened by the flow of propellent through the propellent-controlling valve member.

2. A control system, a pump supplying propellent to a burner assembly in a rocket engine, including a shut-off valve located between the pump and the burner assembly, said shut-off valve comprising a housing, having therein a pair of spaced valve seats; a pair of co-axial valve members, each co-operable with a respective seat, one of the valve members being operable to control the flow of propellent from the propellent pump, through the housing to the burner assembly and the other valve member being operable to control a vent communicating with the space in the housing between the two seats, whereby any propellent in the space when the propellent-controlling valve member is closed will be drained from the housing, spring means arranged to bias the valve members to positions in which the propellent-controlling valve member is closed and the vent-controlling valve member is open and a piston responsive to a pressure produced during the operation of the engine and movable thereby against the bias of the spring means into the position in which the propellent-controlling valve member is open and the vent-controlling valve member is closed, said control system also including a bleed valve positioned upstream of said shut-off valve, the bleed valve having an outlet, through which propellent can be drained from the system upstream of the shut-off valve, and through which air can be bled from the system during starting of the engine, and a valve member controlling flow through said outlet, spring means arranged to hold said valve member open, except during operation of the pump, when the delivery pressure of the latter will oppose said spring means and thereby close said outlet.

3. A control system as claimed in claim 2 in which the shut-off valve housing also includes an inlet to be connected to a source of nitrogen to purge the burner assembly, when the propellent-controlling valve member is in the closed position, and a non-return valve member, positioned downstream of the propellent-controlling valve member and arranged to isolate the space between said seats from the burner assembly and to be opened by the flow of propellent through the propellent-controlling valve member.

References Cited
UNITED STATES PATENTS

| | | | |
|---|---|---|---|
| 2,397,659 | 4/1946 | Goddard | 60—35.6 |
| 2,601,607 | 6/1952 | Halford et al. | 60—35.6 |
| 3,017,745 | 1/1962 | Shirley et al. | 60—35.6 |
| 3,100,001 | 8/1963 | Forwald | 137—630.19 |
| 3,159,166 | 12/1964 | Luedemann et al. | 60—39.09 |

CARLTON R. CROYLE, *Primary Examiner.*

MARK NEWMAN, *Examiner.*

D. HART, *Assistant Examiner.*